United States Patent
Kowal et al.

(10) Patent No.: US 10,933,818 B2
(45) Date of Patent: Mar. 2, 2021

(54) REMOVABLE ROOF DITCH MOLDING COVER FOR ACCESSORY MOUNTING STUDS

(71) Applicant: FORD GLOBAL TECHNOLOGIES, LLC, Dearborn, MI (US)

(72) Inventors: Stephen Kowal, Allen Park, MI (US); Nicholas Cach, Chesterfield, MI (US); Scott Stinson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 16/178,785

(22) Filed: Nov. 2, 2018

(65) Prior Publication Data
US 2020/0139901 A1 May 7, 2020

(51) Int. Cl.
| B60R 13/04 | (2006.01) |
| B60R 13/06 | (2006.01) |
| F16B 5/12 | (2006.01) |
| F16B 21/08 | (2006.01) |

(52) U.S. Cl.
CPC .......... B60R 13/04 (2013.01); B60R 13/06 (2013.01); F16B 5/123 (2013.01); F16B 5/128 (2013.01); F16B 21/08 (2013.01)

(58) Field of Classification Search
CPC .......... F16B 5/128; B62D 25/07; B60R 13/04
USPC ................................................. 296/213, 1.08
See application file for complete search history.

(56) References Cited

U.S. PATENT DOCUMENTS

| 4,401,701 | A | * | 8/1983 | Wolters | B60R 13/04 293/1 |
| 4,491,614 | A | * | 1/1985 | Wolters | B60R 13/04 293/1 |
| 5,168,604 | A | * | 12/1992 | Boville | F16B 5/123 24/297 |
| 5,202,172 | A | * | 4/1993 | Graf | F16B 5/123 24/292 |
| 7,695,038 | B2 | | 4/2010 | Harberts et al. | |
| 9,168,878 | B2 | | 10/2015 | Bozinovski | |
| 2005/0082813 | A1 | * | 4/2005 | Seong | B60R 13/0206 280/782 |
| 2008/0073924 | A1 | * | 3/2008 | Sakamoto | B60R 13/04 296/1.08 |
| 2009/0021053 | A1 | * | 1/2009 | Harberts | B60R 13/04 296/213 |
| 2009/0102241 | A1 | * | 4/2009 | Harberts | B60R 13/04 296/213 |
| 2014/0265455 | A1 | * | 9/2014 | Fulton | F16B 5/128 296/210 |
| 2015/0298632 | A1 | * | 10/2015 | Chiba | B60R 13/04 296/1.08 |
| 2018/0001840 | A1 | * | 1/2018 | Talebpour | B60R 13/0206 |

(Continued)

FOREIGN PATENT DOCUMENTS

| JP | 2002301993 | 10/2002 |
| JP | 2006256365 | 9/2006 |
| JP | 2016215673 | 12/2016 |

Primary Examiner — Jason S Morrow
(74) Attorney, Agent, or Firm — David Coppiellie; Carlson, Gaskey & Olds, P.C.

(57) ABSTRACT

A disclosed vehicle roof molding assembly includes a base portion including an attachment portion on a first end and a securement portion on a second end. A cover portion is attached at one end to the attachment portion and at a second end to the securement portion of the base portion.

16 Claims, 5 Drawing Sheets

(56) References Cited

U.S. PATENT DOCUMENTS

2019/0232890 A1* 8/2019 Nydam .................. B60R 13/06
2019/0241131 A1* 8/2019 Wittmann ............... B60R 13/04

* cited by examiner

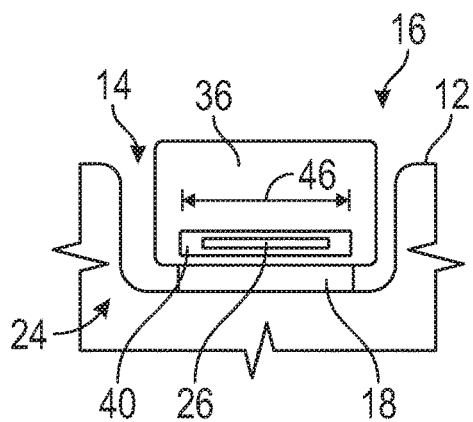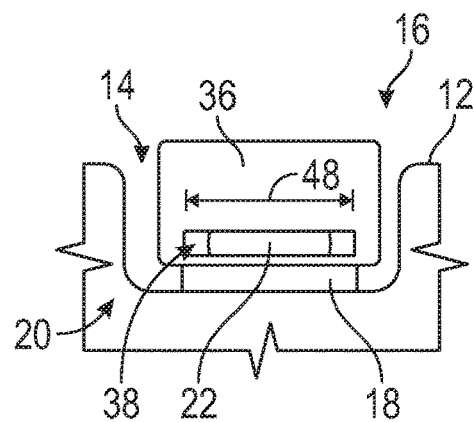
FIG. 7  FIG. 8
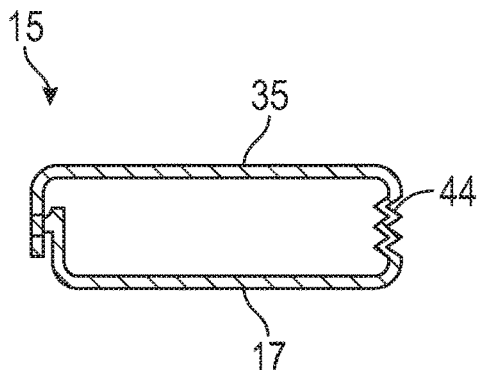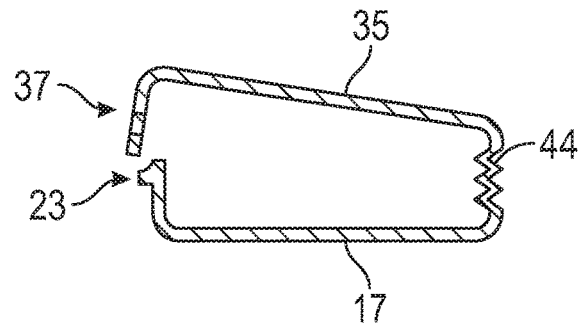
FIG. 9A  FIG. 9B
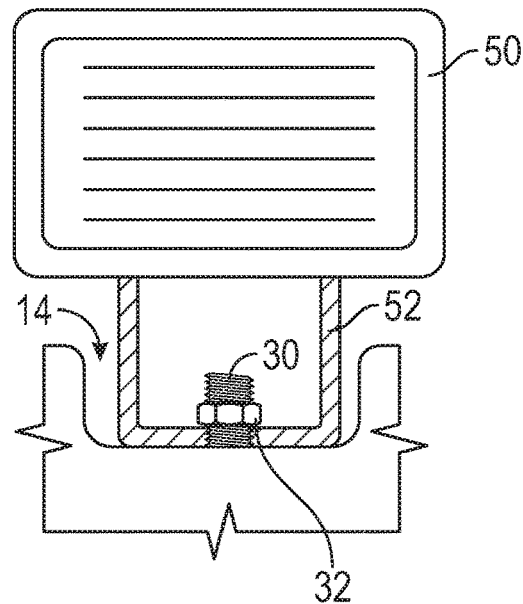
FIG. 10

REMOVABLE ROOF DITCH MOLDING COVER FOR ACCESSORY MOUNTING STUDS

TECHNICAL FIELD

This disclosure relates to a roof ditch molding that is removable to enable mounting of accessory items.

BACKGROUND

Vehicle roof structures include moldings covering a seam between body panels and the roof structure. The seam is provided within a channel known as a roof ditch. The roof ditch provides water management and a roof ditch molding covers the ditch to provide a desired appearance. The roof ditch molding is typically attached in a manner that is not intended to be removed by a vehicle owner. In some vehicle configurations, accessory structures are mounted to a vehicle roof. Accessory structures can include roof racks, light bars and other mounting structures.

Vehicle manufacturers are continuously seeking improvements to meet changing consumer demands and maintain interest by introducing new product features that enable owner customization.

SUMMARY

A vehicle roof molding assembly according to an exemplary aspect of the present disclosure includes, among other things, a base portion including an attachment portion on a first end and a securement portion on a second end and a cover portion attached at one end to the attachment portion and at a second end to the securement portion of the base portion.

In a further non-limiting embodiment of the foregoing roof molding assembly, the base portion includes openings for receiving threaded members for securing the base portion to the vehicle structure.

In a further non-limiting embodiment of the foregoing roof molding assembly, a nut is secured to the threaded members for removably securing the base portion to the vehicle roof.

In a further non-limiting embodiment of the foregoing roof molding assembly, the attachment portion comprises a flange disposed parallel to the base portion and the cover portion includes a slot receiving the flange.

In a further non-limiting embodiment of the foregoing roof molding assembly, the securement portion comprises a tab extending transverse from the base portion and the cover portion includes an opening receiving a portion of the tab.

In a further non-limiting embodiment of the foregoing roof molding assembly, the tab comprises a snap portion that extends outward through the opening and is accessible from an exterior of the roof molding.

In a further non-limiting embodiment of the foregoing roof molding assembly, the base portion includes biasing members that exert an outward bias force on the cover portion.

In a further non-limiting embodiment of the foregoing roof molding assembly, the cover portion and the base portion are separate mating parts.

In a further non-limiting embodiment of the foregoing roof molding assembly, the cover portion and the base portion are one integral part and the attachment portion comprises a hinge portion between the cover portion and the base portion.

A roof ditch assembly for a motor vehicle according to another non-limiting embodiment includes, among other things, a roof ditch including a plurality of outward extending threaded members, a base portion including mounting openings receiving the threaded members, and a tab extending transverse to the base portion. A cover portion is secured by the tab to the base.

In a further non-limiting embodiment of the foregoing roof ditch assembly, the cover includes an opening receiving a portion of the tab at one end and a slot on a second end receiving a flange of the base portion.

In a further non-limiting embodiment of any of the foregoing roof ditch assemblies, the base portion includes a transverse wall on the second end and the flange extends outward from the transverse wall.

In a further non-limiting embodiment of any of the foregoing roof ditch assemblies, including a hinge attaching the cover portion to the base portion.

In a further non-limiting embodiment of any of the foregoing roof ditch assemblies, including fingers biasing the cover portion away from the base portion.

A method of mounting an accessory item to a vehicle roof according to another non-limiting embodiment includes, among other things, releasing a tab disposed on a base portion within a roof ditch to free one end of a cover portion, pivoting the cover portion from the base portion to expose threaded securement fasteners, removing the base portion and cover portion, and mounting an accessory item onto the threaded fasteners within the roof ditch.

A further non-limiting embodiment of the foregoing method includes removing a second end of the cover portion from the base portion by removing a flange of the base portion from a slot in the cover portion.

In a further non-limiting embodiment of the foregoing method wherein the flange extends outward from the base portion.

A further non-limiting embodiment of any of the foregoing methods, including securing the cover portion to the base portion with a hinge portion and pivoting the cover portion about the hinge portion to expose the threaded securement fasteners.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 7 is an end view of one end of the example roof ditch molding assembly.

FIG. 8 is end view of another end of the example roof ditch molding assembly.

FIG. 9A is a schematic view of another example roof ditch molding assembly in an assembled position.

FIG. 9B is a schematic view of the example roof ditch molding in a position enabling disassembly.

FIG. 10 is a partial cross-sectional view of a light accessory mounted within the roof ditch.

DETAILED DESCRIPTION

Figure 1:
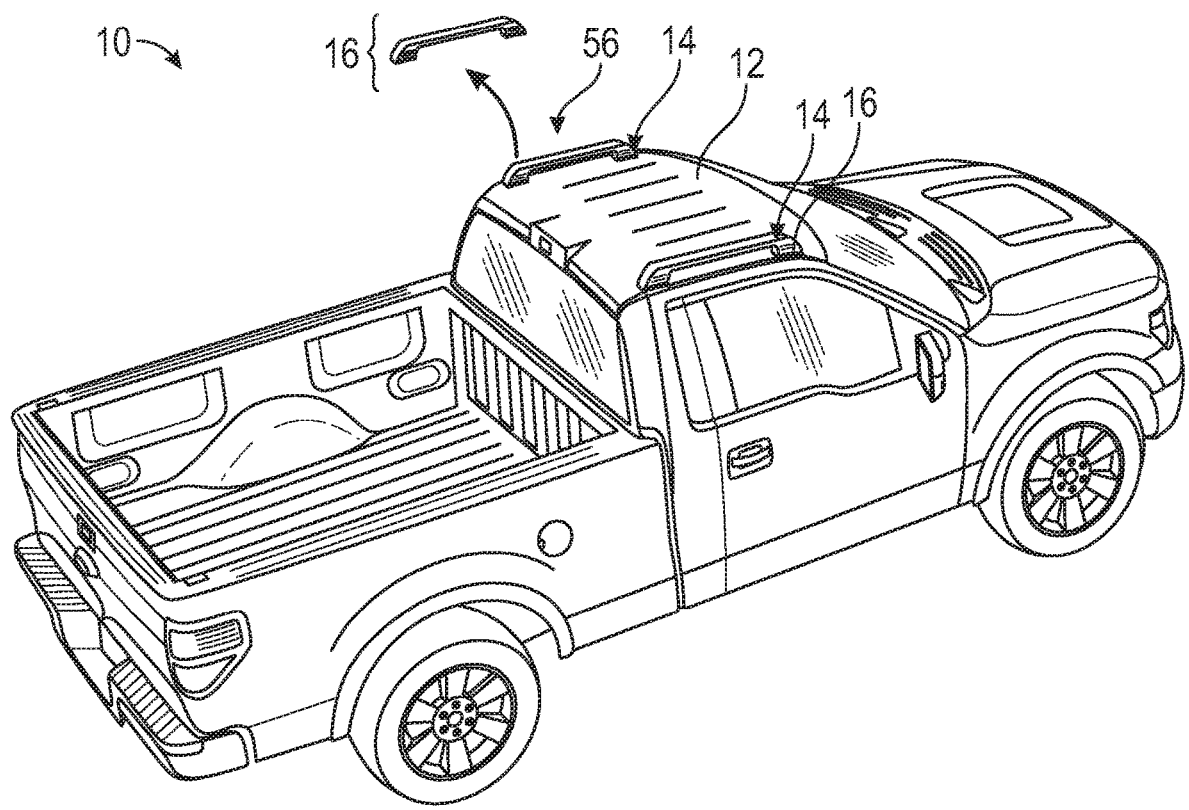
FIG. 1 is a schematic view of an example vehicle including an example roof ditch and molding assembly.
Figure 2:
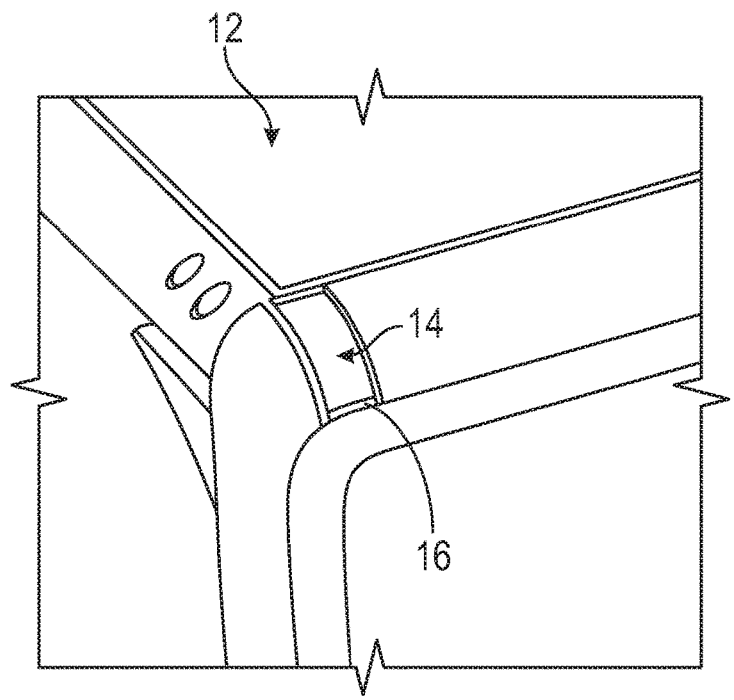
FIG. 2 is a schematic view of the example vehicle including the example roof ditch molding assembly.

Referring to FIGS. 1 and 2, a vehicle 10 may include a roof 12 that includes a channel referred to as a roof ditch 14. The roof ditch 14 is a channel within the roof 12 that directs water away from sides of the vehicle and may also include the attachment weld securing the roof to the vehicle. A ditch molding assembly 16 covers the roof ditch 10 and provides a desired aesthetic appearance as well as providing water management functions. The disclosed roof ditch molding assembly 16 is removable to enable mounting of accessory structures, such as a roof rack 56 shown in FIG. 1. Although a roof rack 56 is shown in FIG. 1 by example, other accessory items are also within the contemplation and scope of this disclosure.

Figure 3:
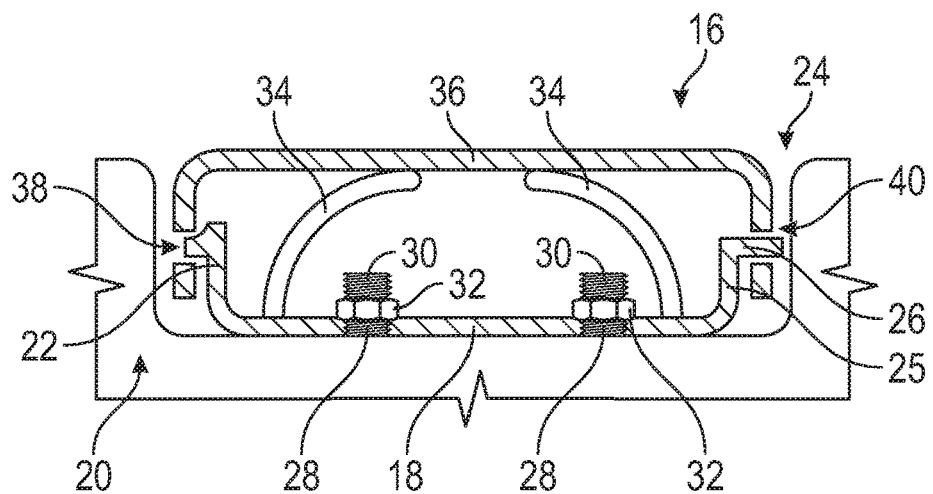
FIG. 3 cross-section of the example of roof ditch molding assembly.
Figure 4:
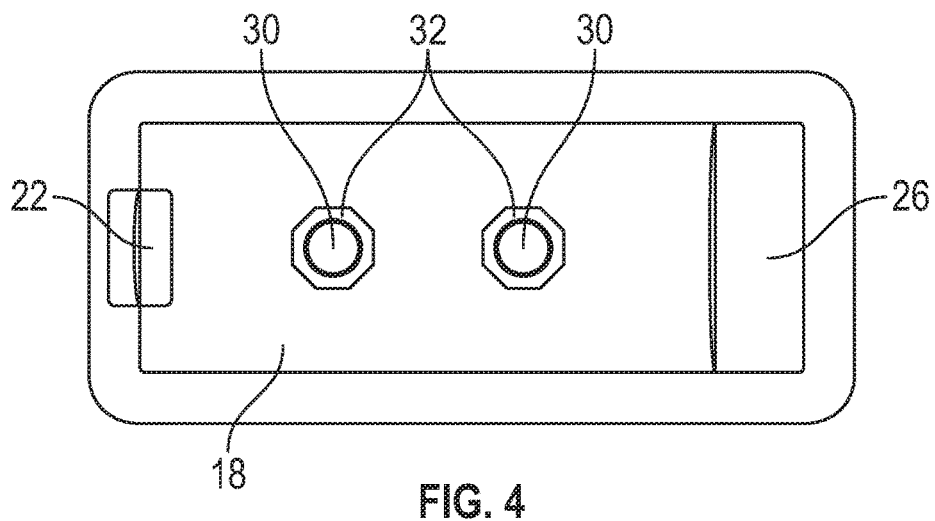
FIG. 4 is a top view of a base portion of the example roof ditch molding assembly.
Figure 5:
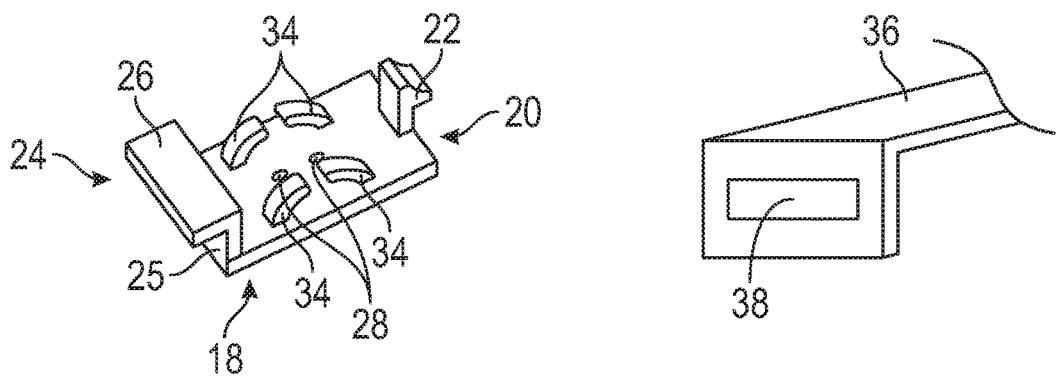
FIG. 5 is a perspective view of the example base portion.
Figure 6:
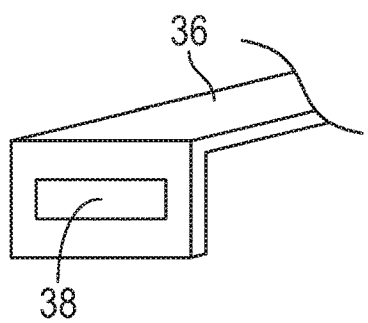
FIG. 6 is a perspective view of an example cover portion of the example roof ditch molding assembly.

Referring to FIGS. 3 and 4, the example ditch molding assembly 16 includes a base portion 18 to which a cover portion 36 is attached. The cover portion 36 is removable from the base portion 18 to provide access to threaded fasteners 28, 30 and enable removal from the roof ditch 14. Removal of the molding assembly 16 provides for mounting of accessory items within the roof ditch 14.

In the disclosed example, the base portion 18 includes a first end 20 with a spring tab 22. The spring tab 22 is biased outward to provide a releasable lock to secure the cover portion 36. The base portion 18 includes a second end 24 that includes a flange 26. The flange 26 extends outwardly from a wall portion 25 and is spaced apart from the base portion 18. The flange 26 is disposed substantially parallel to the base portion 18 and provides a structure for releasable attachment of the cover portion 36.

Referring to FIGS. 5, 6, 7 and 8 with continued reference to FIGS. 3 and 4, the cover portion 36 includes a first slot 38 that is configured to receive a portion of the tab 22. The cover portion 36 further includes a second slot 40 that is configured to receive the flange 26. The cover portion 36 is secured to the base portion 18 by sliding the flange 26 into the second slot 40. The cover portion 36 is then pivoted downward onto the base portion 18 such that part of the tab 22 snaps into the first slot 38 of the cover portion 36. The first slot 38 and the second slot 40 may include corresponding widths 46, 48. The widths 46, 48 may be of a common size to enable installation of the cover portion 36 in any orientation. Alternatively, the widths 46, 48 of the first slot 38 and the second slot 40 maybe different to enable securement to the base portion 18 in only one desired manner.

The base portion 18 may include fingers 34 that bias the cover portion 36 toward a release position. In the release position, the cover portion 36 is raised relative to the roof 12. The biasing force provided by the fingers 34 function to pop the cover portion 36 upward upon release of the tab 22 from the first slot 38. The cover portion 36 becomes easier to remove once popped upward by the fingers. As appreciated, the cover portion 36 maybe sealed or flush with the vehicle roof structure and therefore the slight upward bias provided by the fingers 34 enables a user to grasp the cover portion 36 for removal.

Referring to FIGS. 9A and 9B, another example molding embodiment is schematically shown at 15 and includes a cover portion 35 attached to a base portion 17 by an integral hinge portion 44. The hinge portion 44, base portion 17 and cover portion 35 are an integral structure. The cover portion 35 includes an opening 37 that receives part of tab 23 to hold the cover portion 35 in place on the base portion 17. Upon release of the tab 23, the cover portion 35 can be pivoted upward to enable access to the base portion 17 and securing fasteners to allow removal.

Referring to FIGS. 3 and 4, the base portion 18 is secured into the roof ditch 14 by the threaded fasteners 30 that are secured to the vehicle roof structure 12. The threaded fasteners 30 are threaded studs that extend upward from a bottom surface of the roof ditch 14. The base portion 18 includes openings 28 that receive the threaded studs 30. The nuts 32 are secured to the threaded studs 30 to secure the base portion 18 and also to enable removal of the molding assembly 16 by a user without damaging the molding assembly 16. Ease of removal of the molding assembly 16 enables the threaded studs 30 to be utilized for securement of vehicle accessory items such as lights, roof racks, camera mounts and any other structure that a vehicle owner may desired to mount to a vehicle roof structure.

Figure 11:
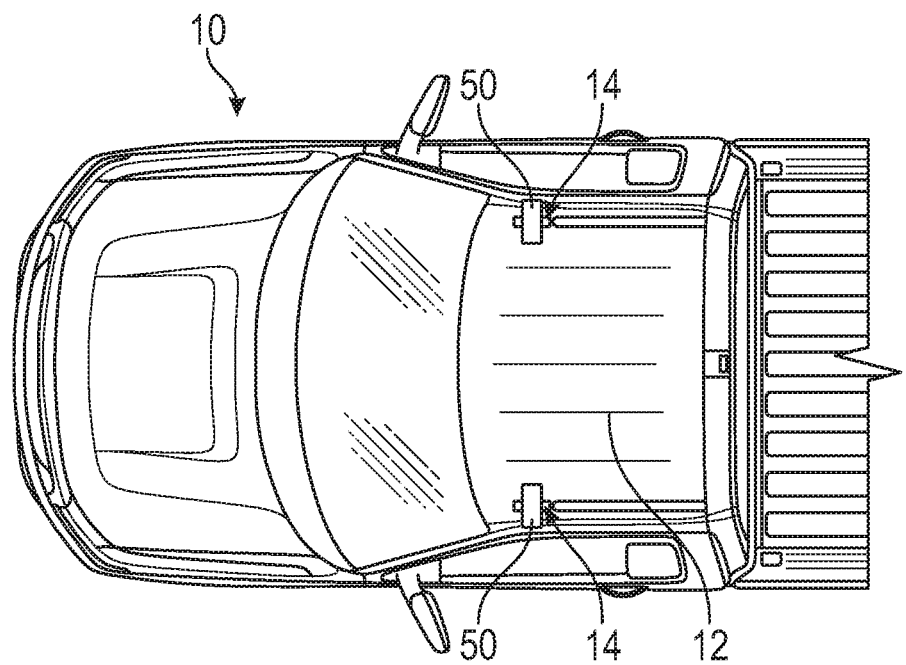
FIG. 11 is a top view of the light accessory mounted within the roof ditch of the vehicle.

Referring to FIGS. 10 and 11, a light accessory 50 includes a base 52 that fits within the roof ditch 14 and is secured to the threaded stud 30 by the nut 32. Upon removal of the molding assembly 16, the roof ditch 14 is exposed and provides an accessible mounting location for many types of accessory items. In this example, the accessory item is the light 50. The base 52 is configured to fit within the roof ditch 14 and includes openings spaced apart to correspond with the spacing between the threaded studs 30.

Figure 12:
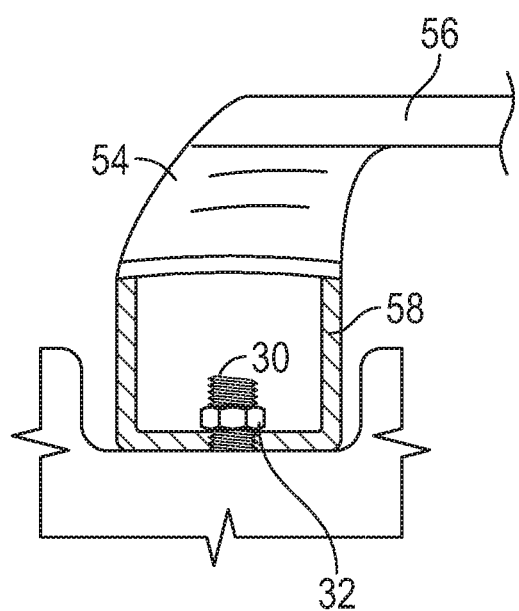
FIG. 12 is a side view of a mount for a roof rack attached within the roof ditch of the vehicle.
Figure 13:
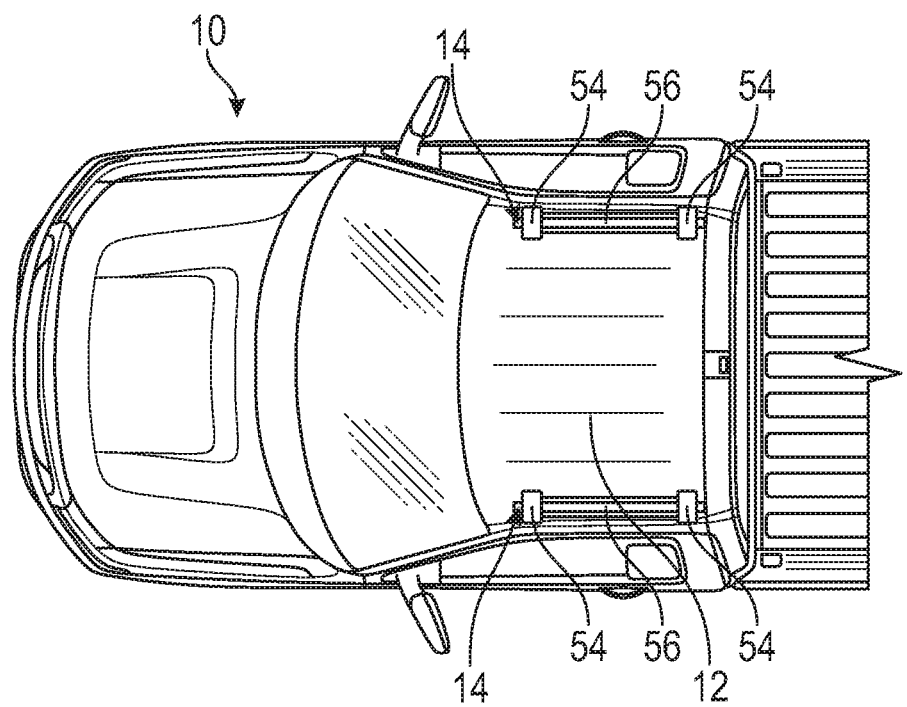
FIG. 13 is a top view of the roof rack mounted within the roof ditch of the vehicle.

Referring to FIGS. 12 and 13, a roof rack assembly 56 is shown and includes bases 54 with mounts 58 that fit within roof ditches 14 disposed on the vehicle roof 12. In this example embodiment, a molding assembly 16 is removed from each location to enable mounting of a base 54 and mount 58. The example roof rack 56 extends between the bases 54 to provide attachment and mounting locations.

It should be appreciated that although a light 50 and roof rack 56 are disclosed by way of example many different accessory items and structures could be mounted within the roof ditch 14. The accessibility to the mounting structures within the roof ditch 14 are provided by the ease of removal and installation enabled by the removable molding assembly 16.

It should be appreciated, that multiple molding assemblies 16 could be arranged in common roof ditch 14 and be separately removable as needed to accommodate different accessory item configurations. Additionally, a single molding assembly 16 could extend across the entire roof ditch 14. The accessory item could then include features to fit within the vacated parts of the roof ditch 14.

In this example, the roof ditch molding assembly 16 is formed from plastic material. The molding assembly includes an exterior surface that is painted or coated to correspond with the vehicle aesthetics. Moreover, the molding assembly 16 could be formed from metal or a combination of metal and plastic to provide both the desired aesthetic appearance and durability required to endure different removals and installations.

Accordingly, the disclosed molding assembly 16 enables removal without excessive difficulty or damage to the roof or molding assembly. The ease of removal enables use of threaded structures within various locations of the roof ditch 14 for accessory structures.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle roof molding assembly comprising:
a base portion including an attachment portion on a first end and a securement portion at a second end; and
a cover portion attached at one end to the attachment portion and at a second end to the securement portion of the base portion, wherein the attachment portion comprises a flange disposed parallel to the base portion and the cover portion includes a slot receiving the flange.

2. The vehicle roof molding assembly as recited in claim 1, wherein the base portion includes openings for receiving threaded members for securing the base portion to the vehicle roof structure.

3. The vehicle roof molding assembly as recited in claim 2, including a nut secured to the threaded members for removably securing the base portion to the vehicle roof.

4. The vehicle roof molding assembly as recited in claim 1, wherein the securement portion comprises a tab extending transvers from the base portion and the cover portion includes an opening receiving a portion of the tab.

5. The vehicle roof molding assembly as recited in claim 4, wherein the tab comprises a snap portion that extends outward through the opening and is accessible from an exterior of the roof molding.

6. The vehicle roof molding assembly as recited in claim 1, wherein the base portion includes biasing members that exert an outward bias force on the cover portion.

7. The vehicle roof molding assembly as recited in claim 1, wherein the cover portion and the base portion are separate mating parts.

8. The vehicle roof molding assembly as recited in claim 1, wherein the cover portion and the base portion are one integral part and the attachment portion comprises a hinge portion between the cover portion and the base portion.

9. A roof ditch assembly for a motor vehicle comprising:
a roof ditch including a plurality of outward extending threaded members;
a base portion including mounting openings receiving the threaded members and a tab extending transverse from the base portion;
a cover portion secured by the tab to the base, wherein the cover includes an opening receiving a portion of the tab at one end and a slot on a second end receiving a flange of the base portion.

10. The roof ditch assembly as recited in claim 9, wherein the base portion includes a transverse wall on the second end and the flange extends outward from the transverse wall.

11. The roof ditch assembly as recited in claim 9, including a hinge attaching the cover portion to the base portion.

12. The roof ditch assembly as recited in claim 9, including fingers biasing the cover portion away from the base portion.

13. A method of mounting an accessory item to a vehicle roof comprising:
releasing a tab disposed on a base portion disposed within a roof ditch to free one end of a cover portion;
pivoting the cover portion away from the base portion to expose threaded securement fasteners;
removing the base portion and cover portion; and
mounting an accessory item onto the threaded fasteners within the roof ditch.

14. The method as recited in claim 13, including removing a second end of the cover portion from the base portion by removing a flange of the base portion from a slot in the cover portion.

15. The method as recited in claim 14, wherein the flange extends outward from the base portion.

16. The method as recited in claim 13, including securing the cover portion to the base portion with a hinge portion and pivoting the cover portion about the hinge portion to expose the threaded securement fasteners.

* * * * *